United States Patent [19]
Marom et al.

[11] Patent Number: 5,196,683
[45] Date of Patent: Mar. 23, 1993

[54] BAR CODE ACQUISITION UTILIZING MOIRE PATTERNS

[75] Inventors: Emanuel Marom; Joseph Katz, both of Stony Brook, N.Y.

[73] Assignee: Symbol Technologies, Inc., Bohemia, N.Y.

[21] Appl. No.: 681,601

[22] Filed: Apr. 8, 1991

[51] Int. Cl.5 .......................... G06K 9/00; G06K 7/10
[52] U.S. Cl. ....................................... 235/462; 382/1
[58] Field of Search ................... 235/462, 467; 382/1

[56] References Cited

U.S. PATENT DOCUMENTS

| | | | |
|---|---|---|---|
| 4,025,898 | 5/1977 | Shaw | 382/4 |
| 4,387,297 | 6/1983 | Swartz et al. | 235/462 |
| 4,541,113 | 9/1985 | Seufert et al. | 384/4 |
| 4,758,717 | 7/1988 | Shepard et al. | 235/472 |
| 4,760,248 | 7/1988 | Swartz et al. | 235/472 |
| 4,873,426 | 10/1989 | Sarna et al. | 235/462 |
| 4,933,538 | 6/1990 | Heiman et al. | 235/462 |
| 4,988,852 | 1/1991 | Krishnan | 235/462 |
| 5,086,215 | 2/1992 | Carsner et al. | 235/462 |
| 5,120,940 | 6/1992 | Willsie | 235/462 |

FOREIGN PATENT DOCUMENTS 39162 2/1986 Japan ................................. 234/462

Primary Examiner—John W. Shepperd

[57] ABSTRACT

A bar code detector or acquisition arrangement for detecting the presence and location of a bar code pattern in a field of view. The bar code pattern detector is not designed to decode a bar code pattern, but merely to be sensitive to and detect the presence of a bar code pattern or patterns so that a conventional bar code scanner can then be activated to perform a decoding operation thereon. The present invention is based upon the generation of Moire patterns, and includes an electro-optic system for detecting and locating a bar code pattern in which an image of a field of view is projected onto a reference bar code pattern or an image thereof while producing relative rotation between the image of the field of view and the reference bar code pattern or image thereof. An optical detector detects the optical interaction of the image of the field of view with the reference bar code pattern or image thereof, including any Moire patterns generated thereby. A processor is coupled to the output of the optical detector for detecting the generation of any such Moire patterns, which are indicative of the presence and location of a bar code pattern or patterns in the field of view.

27 Claims, 4 Drawing Sheets

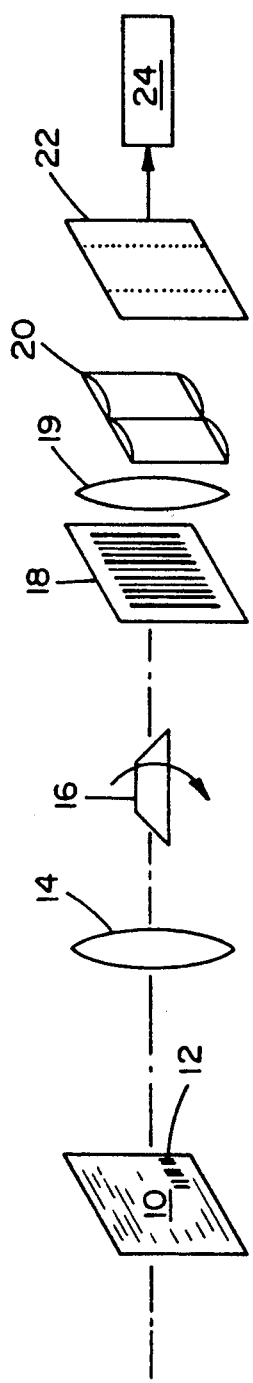
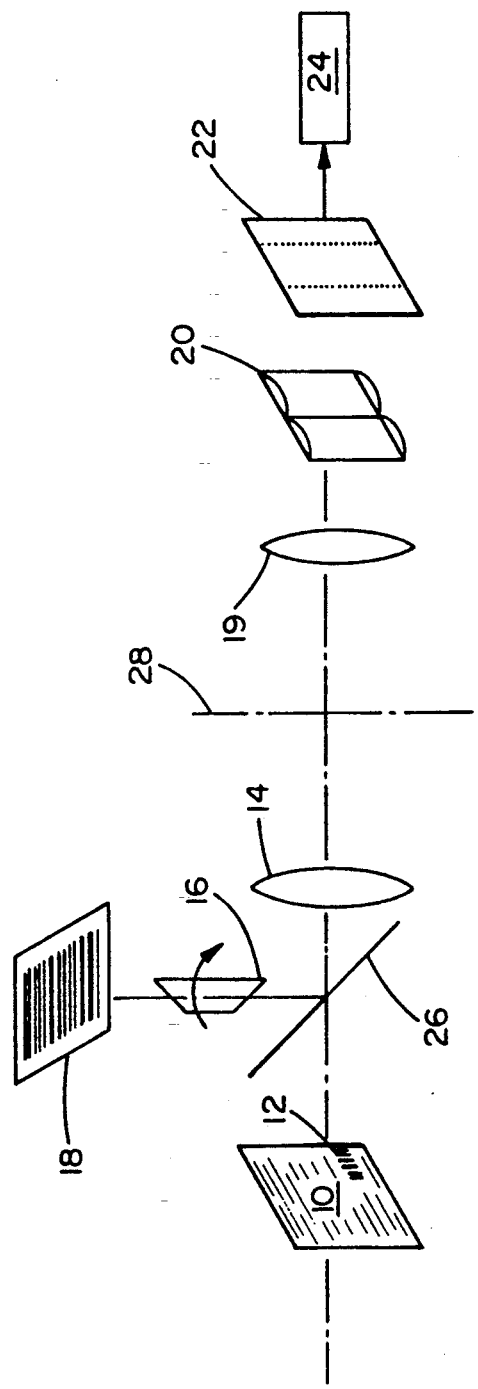
FIG.5
FIG.6

BAR CODE ACQUISITION UTILIZING MOIRE PATTERNS

BACKGROUND OF THE INVENTION

1. Field of the Invention

The present invention relates generally to a bar code detector or acquisition system and method for detecting the presence and location of a bar code pattern in a field of view. The bar code pattern detector of the subject invention is not designed to decode a bar code pattern, but merely to be sensitive to and detect the presence of a bar code pattern so that a conventional bar code scanner can then be activated and perform a decoding operation thereon.

More particularly, the subject invention pertains to a bar code detector or acquisition system and method as described which is based upon the production of Moire patterns, and includes an electro-optic system for detecting and locating Moire patterns and thereby detecting and locating the bar code pattern or patterns causing their generation. The electro-optic system is designed to operate in an imaging mode in a work environment which is diffusely illuminated by ambient light.

2. Discussion of the Prior Art

The increased use of bar code symbols to identify products, particularly in retail businesses, has resulted in the development of various bar code reading systems. Many users of bar code readers require portable hand-held scanners which place a premium on small size, lightweight and low power consumption requirements for the devices. One such system is a laser scanning bar code reading system as described in U.S. Pat. No. 4,496,831, commonly assigned to the same assignee as the present patent application.

The laser scanning system disclosed in U.S. Pat. No. 4,496,831 includes a portable hand-held scanning head which may be embodied in various shapes but preferably has a gun shaped housing made of lightweight plastic. A handle and barrel portion are provided to house the various components of the scanning head therein. Within the barrel portion are mounted a miniature light source, a miniature optic train including focusing lenses and a scanning system for directing light from the light source across a bar code symbol, and miniature sensing means for detecting reflected light from the bar code symbol being scanned.

The miniature light source can comprise a laser tube such as a coaxial helium neon laser tube, or an LED, or preferably a semiconductor laser diode which is considerably smaller and lighter than a laser tube, thus reducing the required size and weight of the scanning head and making the scanning head easier to handle and more maneuverable. Light generated by the light source passes through the optic train which directs the beam onto the scanning system which is mounted within the barrel portion of the scanning head. The scanning system sweeps the laser beam across the bar code symbol and comprises at least one scanning stepping motor or resonating or vibrating bar or scanner for sweeping the beam lengthwise across the symbol, and may comprise two motors wherein the second motor sweeps the beam widthwise across the symbol. Light reflecting mirrors are mounted on the motor shaft or shafts to direct the beam through the outlet port to the symbol.

A sensing circuit then detects and processes the light reflected from the symbol and generally comprises a photodetector element such as a semiconductor photodiode. The user positions the hand-held unit so the scan pattern traverses the symbol to be read, and the photodetector element produces serial electrical signals to be processed for identifying the bar code. A signal processing circuit for a bar code produces a signal which is directed to a bar pattern decoder circuit for decoding the bar pattern.

The reader unit can have a movable trigger employed to allow the user to activate the light beam and detector circuitry when pointed at the symbol to be read, thereby conserving battery life if the unit is self-powered. The lightweight plastic housing contains the laser light source, the detector, the optics, signal processing circuitry, a CPU and a battery. The reader is designed to be aimed at a bar code symbol by the user from a position where the reader is spaced from the symbol, i.e., not touching the symbol or moving across the symbol. Typically, this type of hand-held bar code reader is specified to operate in the range of perhaps several inches.

Alternatively, the scanning can be performed automatically without any human interface or intervention.

One disadvantage of such prior art bar code detection systems is that the laser scanner is frequently triggered on when a bar code pattern is not present in the field of view of the bar code scanner, which results in a shortened operational lifetime for the laser of the laser scanner.

SUMMARY OF THE INVENTION

Accordingly, it is a primary object of the present invention to provide a bar code acquisition system and method for detecting the presence and location of a bar code pattern in a field of view. The bar code pattern acquisition arrangement of the subject invention is not designed to decode a bar code pattern, but merely to be sensitive to and detect the presence of a bar code pattern so that a conventional bar code scanner can then be activated to perform a decoding operation thereon.

A further object of the subject invention is the provision of a bar code acquisition arrangement which is designed to be utilized with a conventional laser scanner bar code decoder system which reduces the active time of operation of the laser scanner, making it operational only when the presence of a bar code pattern has been detected, and thus extending the operational lifetime of the laser. The bar code pattern, occupying only a small portion of the field of view and having an arbitrary orientation, is detected and located by the subject invention before a bar code decoding scanner performs a decoding operation on the detected bar code pattern.

The technical approach of the present invention is based upon the production of Moire patterns, and includes an electro-optic system for detecting and locating Moire patterns and thereby detecting and locating a bar code pattern or patterns causing their generation. The electro-optic system is designed to operate in an imaging mode in a work environment which is diffusely illuminated by ambient light. Moreover, the present invention should be relatively unaffected by the alignment or orientation of the bar code pattern, and should also have a substantial optical depth of field.

In accordance with the teachings herein, the present invention provides a system and method for detecting the presence of a bar code pattern in a field of view. An image of the field of view is projected on a reference periodic grating pattern or reference bar code pattern or an image thereof while producing relative rotation between the image of the field of view and the reference pattern or image thereof. An optical detector detects the optical interaction of the image of the field of view with the reference pattern or image thereof, including any Moire patterns generated thereby. A processor is coupled to the output of the optical detector for detecting the presence and location of any such Moire patterns, which are indicative of the presence and location of a bar code pattern or patterns in the field of view.

The reference pattern is preferably a periodic pattern having a grating frequency approximately equal to the frequency pattern of the fine lines of a bar code pattern to be detected, or alternatively can be a reference bar code pattern. A bar code pattern can be considered to be a superposition of a plurality of regular gratings, some of which are similar to or the same as the reference grating, and as such will generate Moire patterns in the bar code acquisition system of the present invention.

In greater detail, a rotating dove prism can be utilized for rotating the image of the field of view projected onto a stationary reference pattern, or for rotating an image of the reference pattern projected onto an image of the field of view. An anamorphic lens system is preferably positioned between the image of the field of view and the optical detector for integrating or averaging optical signals along a direction generally perpendicular to the lines of the reference pattern. The anamorphic lens system can include a plurality of cylindrical lenses for dividing the field of view into a plurality of detector areas, such that the location of the detected bar code pattern can be determined to be in one of the plurality of detector areas of the field of view. The optical detector can be a detector array, wherein the detector array comprises in one direction a number of detector lines equal to the number of cylindrical lenses and in a second direction comprises a number n of detector elements in each line, such as in a CCD detector array, or can be any other suitable optical detector. The optical detector can also comprise a number of elongated detector lines, one for each cylindrical lens.

An electronic processor processes the outputs of the optical detector to indicate the presence and general location of the detected bar code pattern or patterns in the field of view. The processor can be based upon any one of a number of different technical approaches. For instance, the processor can include a filter for detecting or passing a detector output above a threshold background signal. For example, with a detector signal $S_k$ and an average background signal $\bar{S}_k$, the filter can pass a signal equal to the integral $\int |S_k - \bar{S}_k|^2 dt$, such that the filter passes an integrated detector signal which must exceed a threshold background signal before a bar code pattern is detected. Alternatively, the processor can correlate successive detector signals $S_k$ and $S_{k+1}$ by a Fourier transform approach and detect peaks above a given threshold passed thereby. Alternatively, the processor can correlate successive detector signals $S_k$ and $S_{k+1}$ directly in the time domain by comparing a first detector signal $S_k$ with a time delayed signal from a second detector $s_{k+1}$ and detect peaks above a given threshold passed thereby.

BRIEF DESCRIPTION OF THE DRAWINGS

The foregoing objects and advantages of the present invention for bar code acquisition utilizing Moire patterns may be more readily understood by one skilled in the art with reference being had to the following detailed description of several preferred embodiments thereof, taken in conjunction with the accompanying drawings in which:

FIG. 5 is a schematic representation of one embodiment of a bar code pattern detection system pursuant to the teachings of the present invention;

FIG. 6 illustrates a schematic representation of a second embodiment of a bar code pattern detection system pursuant to the subject invention;

DETAILED DESCRIPTION OF THE DRAWINGS

Figure 1:
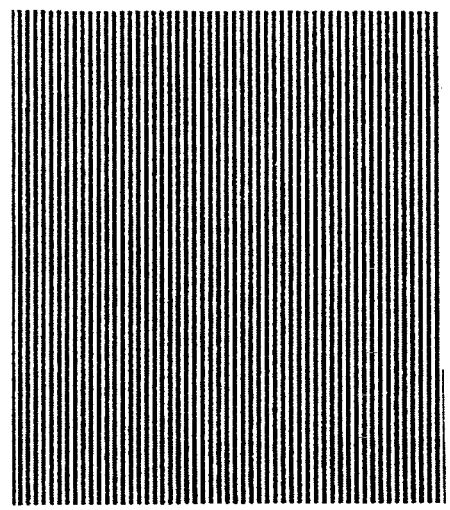
FIG. 1 illustrates a periodic grating, two of which can be superimposed in an angularly displaced manner to produce a Moire pattern.

Referring to the drawings in detail, FIG. 1 illustrates a periodic grating, two of which can be superimposed in an angularly displaced manner to produce a Moire pattern. A Moire pattern is generated when two identical or nearly identical high frequency periodic gratings as illustrated in FIG. 1 are superimposed at angularly displaced positions with respect to each other. This arrangement produces a low frequency Moire pattern substantially perpendicular to the high frequency grating lines.

Figure 2:
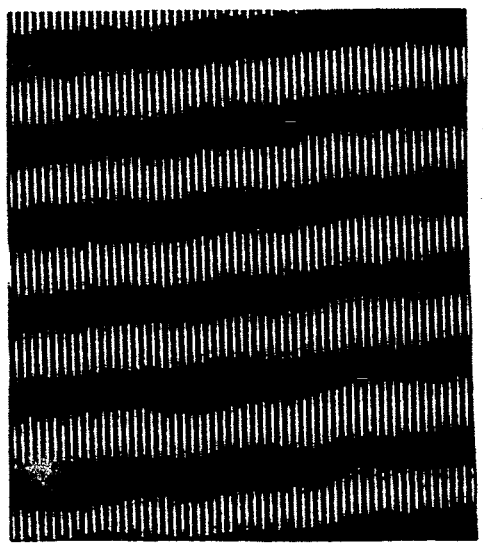
FIG. 2 shows a Moire pattern produced by two superimposed periodic gratings as shown in FIG. 1, angularly displaced with respect to each other by 6.8°.
Figure 3:
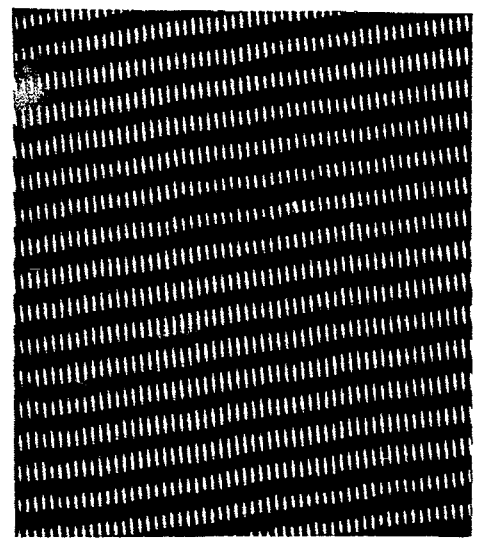
FIG. 3 illustrates a Moire pattern produced by two superimposed periodic gratings as shown in FIG. 1, angularly displaced with respect to each other by 16.7°.

The spatial frequency of the Moire pattern is directly related to the angular displacement of the gratings. FIG. 2 shows a Moire pattern produced by two superimposed periodic gratings as shown in FIG. 1, angularly displaced with respect to each other by 6.8°, while FIG. 3 illustrates the Moire pattern produced by the two superimposed periodic gratings angularly displaced with respect to each other by 16.7°. As illustrated by FIGS. 2 and 3, the Moire pattern assumes a higher frequency with more horizontal Moire pattern lines with increasing angular displacements. Pursuant to the present invention, Moire patterns are produced and detected when the periodic grating lines of two periodic gratings are positioned from generally parallel positions to positions angularly displaced up to 10° to 20°.

Figure 4:
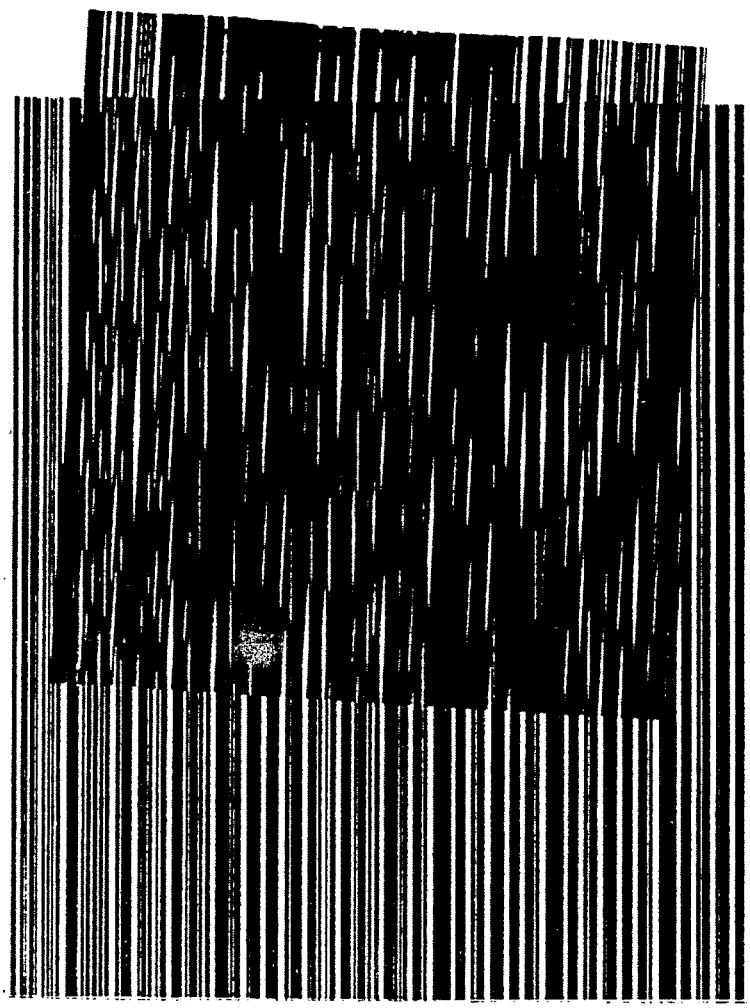
FIG. 4 illustrates a Moire pattern produced by two nonidentical bar code patterns slightly angularly displaced with respect to each other.

Bar code patterns contain bar and space components similar to high frequency periodic gratings. A bar code pattern can be considered to be a superposition of a plurality of regular gratings, some of which are similar to or the same as the reference grating, and as such will generate Moire patterns in the bar code acquisition system of the present invention. When two bar code patterns are superimposed at slightly angularly displaced positions with respect to each other, an irregular or generalized Moire pattern is generated. FIG. 4 illustrates a generalized Moire pattern produced by two nonidentical bar code patterns slightly angularly displaced with respect to each other. As illustrated, a generalized Moire pattern is produced when one bar code pattern grating optically interacts with a totally different bar code pattern grating. This is not the case for uniform periodic gratings, which do not produce Moire patterns for nonidentical uniform periodic gratings.

If an image of a field of view containing a bar code pattern is observed in association with a rotating periodic grating pattern or reference bar code pattern filling the entire field of view, then the bar code pattern can be detected by detecting the location at which a generalized Moire pattern appears in the field of view. The reference pattern is preferably a periodic pattern having a grating frequency approximately equal to the frequency pattern of the fine lines of a bar code pattern to be detected, or alternatively can be a reference bar code pattern.

When an image of a field of view having a bar code pattern therein is rotated with respect to a reference periodic grating pattern or reference bar code pattern, then low spatial frequency Moire patterns move along the direction of the lines of the reference pattern and can be detected. (This is similar to the situation shown in FIGS. 2 and 3, for example, when two identical periodic gratings are displaced from the 6.8° angular position of FIG. 2 to the 16.7° angular position of FIG. 3, and the Moire pattern lines move and become more dense as they gradually achieve the representation of FIG. 3.) If a detector integrates the light intensity perpendicular to the lines of the reference pattern, i.e. along the Moire patterns, a strong (high contrast) high frequency temporal signal component is detected only where the two periodic patterns are superimposed. In contrast thereto, when a periodic grating or reference bar code pattern is superimposed upon the image of a general background scene (having printed lines, miscellaneous images and figures, etc.) not having a bar code pattern present therein, the composite background scene having high spatial frequency components results in small signal variations with a low signal to noise ratio, which is easily discernible from the previous case.

FIG. 5 illustrates a first exemplary embodiment of a bar code pattern detector pursuant to the teachings of the present invention. Referring thereto, an input scene 10 having a bar code pattern 12 randomly located therein is imaged by a lens system 14 and rotating dove prism 16 onto a reference bar code pattern 18 located at or near an image plane. As is well known in the art, as the dove prism 16 is rotated at an angular velocity, the image of the input scene is rotated at an angular velocity of 2. Thus, the image of the input scene 10 with the bar code pattern 12 is rotated with respect to the stationary reference bar code pattern 18, which results in Moire patterns of constantly changing frequencies exhibited in a direction substantially perpendicular to the direction of the lines of the reference pattern 18 (i.e. the horizontal direction in FIG. 6), as illustrated generally in FIGS. 2 and 3. A spherical lens system 19 and an anamorphic lens system 20, comprising one or more (two in FIG. 5) cylindrical lenses, images the changing Moire patterns upon a detector array 22, wherein the detector array comprises in one direction a number of detector lines equal to the number of cylindrical lenses and in a second direction comprises a number n of detector elements in each line, such as in a CCD detector array. Each cylindrical lens integrates or averages the detected radiation in a direction perpendicular to the lines of the reference pattern to detect Moire pattern movements in a horizontal direction.

The output of the detector array 22 is then analyzed in an electronic processor 24 which detects the presence of any low frequency Moire patterns, and moreover can also detect vertical movements of the Moire patterns.

In analyzing the signals in the embodiment of FIG. 5 for the position and orientation of the detected bar code pattern in the field of view, the angular position of the dove prism 16 at the time of detection is known, which indicates the orientation of the bar code pattern in the field of view. The focusing optical system 19 and number n of cylindrical lenses divides the field of view into n portions, and accordingly detection of a bar code symbol by the detectors for a particular cylindrical lens indicate which portion of the field of view the detected bar code pattern is in. Moreover, the positions of the detector signals from the detectors behind each particular cylindrical lens indicate the particular location of the field of view in which the bar code pattern is located.

FIG. 6 illustrates a second exemplary embodiment of a bar code pattern detector pursuant to the teachings of the present invention wherein an image of a reference pattern is rotated relative to a stationary image of the field of view, rather than vice versa as in the embodiment of FIG. 6. Referring thereto, an input scene 10 having a bar code pattern 12 randomly located therein is imaged by a lens system 14 through a beamsplitter 26 at an image plane 28. A reference pattern 18 is reflected by beamsplitter 26 and imaged by lens 14 at an image plane 28, and the image of the reference pattern 18 is rotated relative to the image of the input scene 10 by a rotating dove prism 16. The optically interacting patterns at image plane 28 are imaged by a spherical lens system 19 and anamorphic lens system 20 onto detector array 22, and processing then proceeds in a manner similar to the embodiment of FIG. 5.

Figure 7A:
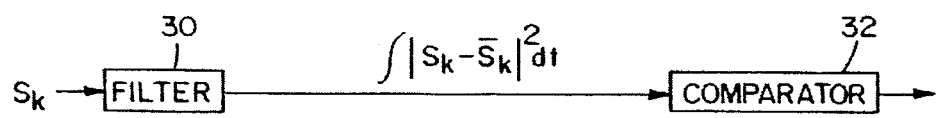
FIG. 7 illustrates in FIGS. 7A, 7B and 7C three different technical approaches to processing the electrical signals from an optical detector for detecting the presence of a bar code pattern or patterns.
Figure 7B:
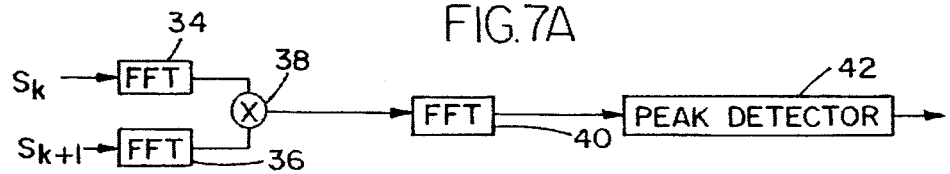
Figure 7C:
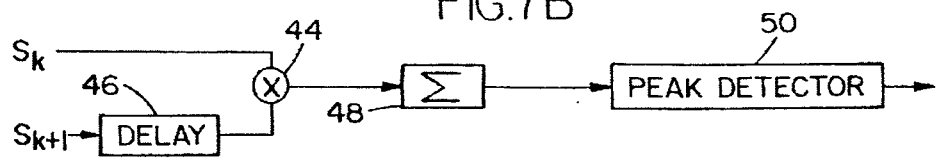

FIG. 7 illustrates in FIGS. 7A, 7B and 7C three different technical approaches for processing the electrical signals from the optical detector for detecting the presence of a bar code pattern in the field of view. The processor can be based upon any one of a number of different technical approaches. For instance, as illustrated by FIG. 7A, the processor can include a signal processor such as a digital filter 30 for passing a detector output signal above a threshold background signal, which is detected by a comparator 32 which compares the passed output signal with a threshold value. For example, with a detector signal $S_k$ and an average background signal $\overline{S}_k$, the filter passes a signal equal to the integral $\int |S_k - \overline{S}_k|^2 dt$, such that the filter passes an integrated detector signal which the comparator 32 compares with a threshold signal level which must be exceeded before a bar code pattern is detected. Alternatively, as illustrated by FIG. 7B, the processor can correlate successive detector signals $S_k$ and $S_{k+1}$ by a Fourier transform approach in which fast Fourier transforms of the successive detector signals are taken at 34 and 36, correlated or multiplied at 38, and the fast Fourier transform of the correlated product taken at 40, and a peak detector 42 detects peaks above a given threshold value passed thereby. Alternatively, as illustrated by FIG. 7C, the processor can correlate successive detector signals $S_k$ and $S_{k+1}$ directly in the time domain by comparing or multiplying a first detector signal $S_k$ with a time delayed (by time delay circuit 46) signal from a second detector $S_{k+1}$, and the passed signals are integrated at 48 and directed to a peak detector 50 which detects peaks above a given threshold value passed thereby.

It should also be noted that the detectability of a low spatial frequency Moire pattern can be increased by a slight defocusing of the anamorphic optical system 20. Thus detection can be improved when the imaging system 20 is not in precise focus, a feature that can be achieved by properly designing the anamorphic lens assembly 20.

Figure 8:
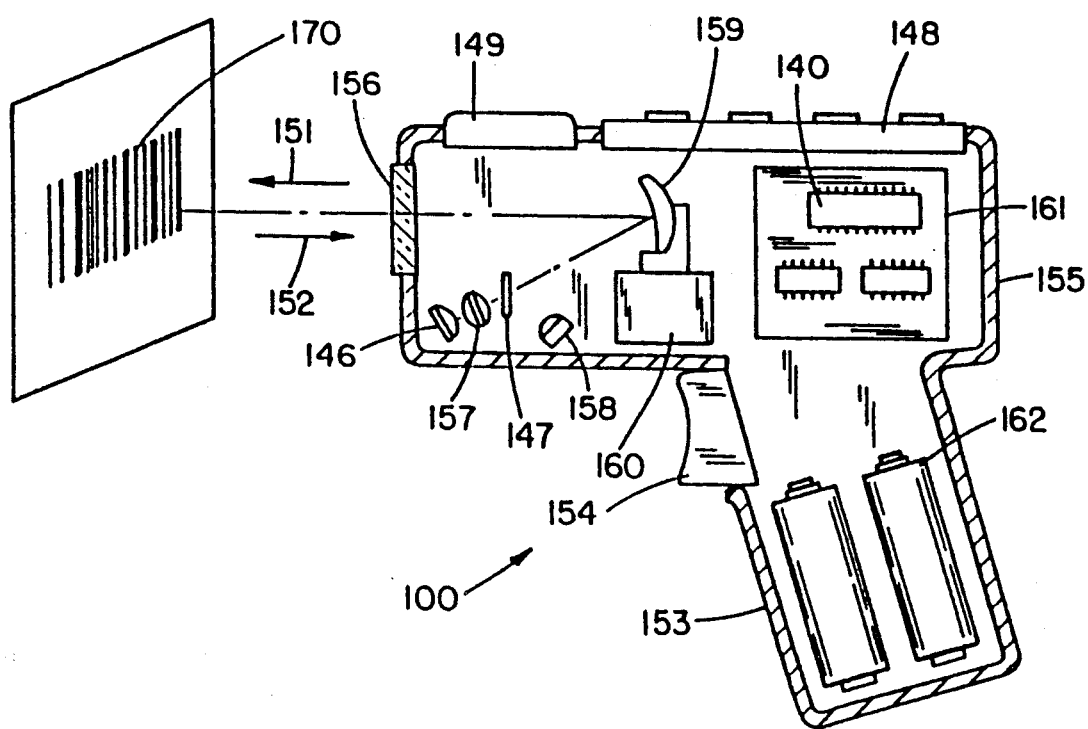
FIG. 8 illustrates a highly simplified embodiment of one type of bar code reader which can be utilized in association with the bar code acquisition system of the present invention.

FIG. 8 illustrates a highly simplified embodiment of one type of bar code reader that may be utilized in association with the bar code acquisition system of the present invention. A reader 100 may be implemented in a hand-held scanner, as illustrated, or a desk-top workstation or stationery scanner. In a preferred embodiment, the arrangement is implemented in a housing 155 that includes an exit port 156 through which an outgoing laser light beam 151 is directed to impinge on, and to be scanned across, symbols 170 located exteriorly of the housing.

The hand-held device of FIG. 8 is generally of the style disclosed in U.S. Pat. No. 4,760,248 issued to Swartz, et al., or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz, et al. or U.S. Pat. No. 4,409,470 issued to Shepard, et al., both such patents assigned to Symbol Technologies, Inc., may be employed in constructing the bar code reader unit of FIG. 8. These U.S. Pat. Nos. 4,760,248, 4,896,026 and 4,409,470 are incorporated herein by reference, but the general design of such devices will be briefly described here for reference.

Referring to FIG. 8 in more detail, an outgoing light beam 151 is generated in the reader 100, usually by a laser diode or the like, and directed to impinge upon a bar code symbol disposed on a target a few inches from the front of the reader unit. The outgoing beam 151 is scanned in a scan pattern, and the user positions the hand-held unit so this scan pattern traverses the symbol to be read. Reflected light 152 from the symbol is detected by a light-responsive device 158 in the reader unit, producing serial electrical signals to be processed and decoded for reproducing the data represented by the bar code.

In a preferred embodiment, the reader unit 100 is a gun shaped device having a pistol-grip type of handle 153, and movable trigger 154 is employed to allow the user to activate the light beam 151 and detector circuitry when pointed at the symbol to be read, thereby saving battery life if the unit is self-powered. A lightweight plastic housing 155 contains the laser light source, the detector 158, the optics and signal processing circuitry, and the CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of perhaps several inches.

The reader 100 may also function as a portable computer terminal, and include a keyboard 148 and a display 149, such as described in the previously noted U.S. Pat. No. 4,409,470.

As further depicted in FIG. 8, a suitable lens 157 (or multiple lens system) may be used to focus the scanned beam onto the bar code symbol at an appropriate reference plane. A light source 146 such as a semiconductor laser diode is positioned to introduce a light beam into the axis of the lens 157, and the beam passes through a partially silvered mirror 147 and other lenses or beam-shaping structure as needed, along with an oscillating mirror 159, which is attached to a scanning motor 160 activated when the trigger 154 is pulled. If the light produced by the source 146 is not visible, an aiming light may be included in the optical system. The aiming light, if needed, produces a visible-light spot which may be fixed, or scanned just like the laser beam; the user employs this visible light to aim the reader unit at the symbol before pulling the trigger 154.

The present invention provides a preprocessing step to a bar code scanner decoder when the location and orientation of a bar code pattern is not known, but also has applications in robotics, machine vision systems, assembly line operations, etc.

While several embodiments and variations of the present invention for bar code acquisition utilizing Moire patterns are described in detail herein, it should be apparent that the disclosure and teachings of the present invention will suggest many alternative designs to those skilled in the art.

What is claimed is:

1. A system for detecting the presence of a bar code pattern in a field of view, comprising:
   a. means for generating an image of the field of view at a reference pattern or image of a reference pattern while producing relative rotation between the image of the field of view and the reference pattern or image thereof;
   b. an optical detector means for detecting the optical interaction of the image of the field of view with the reference pattern or image thereof, including any Moire patterns generated by the optical interaction; and
   c. a processor coupled to the output of said optical detector means for detecting the generation of any Moire patterns, which are indicative of the presence of a bar code pattern in the field of view.

2. A system for detecting the presence of a bar code pattern in a field of view as claimed in claim 1, said generating means including means for rotating the image of the field of view projected onto a stationary reference pattern.

3. A system for detecting the presence of a bar code pattern in a field of view as claimed in claim 2, wherein said means for rotating includes a rotating dove prism.

4. A system for detecting the presence of a bar code pattern in a field of view as claimed in claim 1, said generating means including means for rotating an image of the reference pattern projected onto an image of the field of view.

5. A system for detecting the presence of a bar code pattern in a field of view as claimed in claim 4, wherein said means for rotating includes a rotating dove prism.

6. A system for detecting the presence of a bar code pattern in a field of view as claimed in claim 1, further including a plurality of anamorphic lenses positioned between an image of the field of view and said optical detector for integrating optical signals refracted by the anamorphic lenses.

7. A system for detecting the presence of a bar code pattern in a field of view as claimed in claim 6, wherein each anamorphic lens includes a cylindrical lens.

8. A system for detecting the presence of a bar code pattern in a field of view as claimed in claim 6, wherein said optical detector is positioned at a slightly out-of-focus position.

9. A system for detecting the presence of a bar code pattern in a field of view as claimed in claim 1, wherein said processor includes an electronic processor for analyzing the outputs of said optical detector.

10. A system for detecting the presence of a bar code pattern in a field of view as claimed in claim 9, wherein said electronic processor correlates successive detector signals $S_k$ and $S_{k+1}$ by taking Fourier transforms of the detector signals.

11. A system for detecting the presence of a bar code pattern in a field of view as claimed in claim 9, wherein said electronic processor correlates successive detector output signals $S_k$ and $S_{k+1}$ directly in the time domain by comparing a first detector signal $S_k$ with a time delayed signal from a second detector $S_{k+1}$.

12. A method for detecting the presence of a bar code pattern in a field of view, comprising:
   a. generating an image of the field of view at a reference pattern or image of a reference pattern while producing relative rotation between the image of the field of view and the reference pattern or image thereof;
   b. detecting the optical interaction of the image of the field of view with the reference pattern or image thereof, including any Moire patterns generated by the optical interaction; and
   c. processing the detected optical interaction to detect the generation of any Moire patterns, which are indicative of the presence of a bar code pattern in the field of view.

13. A method for detecting the presence of a bar code pattern in a field of view as claimed in claim 12, said generating step including rotating the image of the field of view projected onto a stationary reference pattern.

14. A method for detecting the presence of a bar code pattern in a field of view as claimed in claim 13, said generating step including rotating the image of the field of view with a rotating dove prism.

15. A method for detecting the presence of a bar code pattern in a field of view as claimed in claim 12, said generating step including rotating an image of a reference pattern projected onto an image of the field of view.

16. A method for detecting the presence of a bar code pattern in a field of view as claimed in claim 15, said generating step including rotating the image of the field of view with a rotating dove prism.

17. A method for detecting the presence of a bar code pattern in a field of view as claimed in claim 12, said detecting step including utilizing a plurality of anamorphic lenses positioned between an image of the field of view and an optical detector for integrating optical signals refracted by the anamorphic lenses.

18. A method for detecting the presence of a bar code pattern in a field of view as claimed in claim 17, said detecting step including utilizing a plurality of cylindrical lenses.

19. A method for detecting the presence of a bar code pattern in a field of view as claimed in claim 17, wherein said detecting step includes positioning an optical detector at a slightly out-of-focus position.

20. A method for detecting the presence of a bar code pattern in a field of view as claimed in claim 12, wherein said processing step includes utilizing an electronic processor for analyzing the outputs of said optical detector.

21. A method for detecting the presence of a bar code pattern in a field of view as claimed in claim 20, wherein said processing step correlates successive detector signals $S_k$ and $S_{k+1}$ by taking Fourier transforms of the detector signals.

22. A method for detecting the presence of a bar code pattern in a field of view as claimed in claim 20, wherein said processing step correlates successive detector output signals $S_k$ and $S_{k+1}$ directly in the time domain by comparing a first detector signal $S_k$ with a time delayed signal from a second detector $S_{k+1}$.

23. A method of automatically determining the position and location of a quasi-periodic pattern or a bar code contained within the image of a target, said pattern or bar code being disposed at an unknown position and location on the target, comprising the steps of:
   generating an image of the field of view at a reference pattern or image of a reference pattern while producing relative motion between the image of the field of view and the reference pattern or image thereof;
   detecting the optical interaction of a candidate pattern in said image with a reference pattern or image thereof; and
   processing said detected optical interaction to determine if said candidate pattern is a quasi-periodic pattern or bar code.

24. A method as defined in claim 23 wherein said detecting step utilizes a reference pattern to generate a sequence of Moire patterns, said Moire patterns being indicative a the presence of a bar code or quasi-periodic pattern in the field of view.

25. A method as defined in claim 23, wherein said step of generating an image of the field of view comprises positioning a grating having a reference pattern between the image plane and the detector.

26. A method as defined in claim 25, wherein said step of detecting a candidate quasi-periodic pattern comprises imaging the interaction of the grating and said image plane on the detector.

27. A method as defined in claim 23, wherein said step of detecting a candidate quasi-periodic pattern comprises imaging a grating on the target and detecting the resulting pattern on the target.

* * * * *